United States Patent [19]

Numano et al.

[11] 4,442,577
[45] Apr. 17, 1984

[54] PROCESSING OF STEEL PIPES OR ROUND BARS

[75] Inventors: Masachik Numano, Yokosuka; Minoru Morita, Kawasaki, both of Japan

[73] Assignee: Nippon Kokan Kabushiki Kaisha, Tokyo, Japan

[21] Appl. No.: 332,217

[22] Filed: Dec. 18, 1981

[30] Foreign Application Priority Data

Dec. 19, 1980 [JP] Japan .................................. 55-178814

[51] Int. Cl.³ ............................................... B23Q 7/16
[52] U.S. Cl. ....................................... 29/33 T; 29/563
[58] Field of Search ..................... 29/33 T, 33 P, 563; 228/9; 408/2; 409/133; 73/45.1, 49.1, 49.5; 209/517, 518, 521; 414/22; 83/79, 358; 144/356, 357; 198/346, 434

[56] References Cited

U.S. PATENT DOCUMENTS

| | | | |
|---|---|---|---|
| 2,902,139 | 9/1959 | Brenkebel | 29/33 T |
| 2,999,403 | 9/1961 | Anderson et al. | 408/2 |
| 3,158,066 | 11/1964 | Salisbury | 409/188 |
| 3,529,510 | 9/1970 | Albright | 409/133 |
| 3,530,571 | 9/1970 | Perry | 29/563 |
| 3,576,540 | 4/1971 | Fair | 29/563 X |
| 4,080,089 | 3/1978 | Matsushima | 408/2 |
| 4,285,460 | 8/1981 | Clavin | 29/33 T |

FOREIGN PATENT DOCUMENTS

| | | | |
|---|---|---|---|
| 2903741 | 8/1980 | Fed. Rep. of Germany | 29/33 T |
| 54-117995 | 9/1979 | Japan | 29/33 T |

Primary Examiner—William R. Briggs
Attorney, Agent, or Firm—Fleit, Jacobson, Cohn & Price

[57] ABSTRACT

There is disclosed an apparatus for performing conditioning operations including cutting operations such as beveling for welding, chamfering to aid in starting thread cutting, thread cutting and lead cutting and inspecting operations such as bevel or chamfer inspection and threads inspection on the ends of seamless steel pipes or round bars transferred from the preceding forming stage such as the rolling stage. The apparatus comprises a plurality of end processing multifunction machines each capable of performing by itself the above-mentioned processing operations and a plurality of end inspecting multifunction machines each capable of performing by itself the above-mentioned inspecting operations and these machines are arranged on one side or both sides of a single-line transverse transfer system. Each steel pipe or round bar to be processed is subjected to the end processing operations at a single fixed position and to the end inspecting operations also at a single fixed position.

3 Claims, 1 Drawing Figure

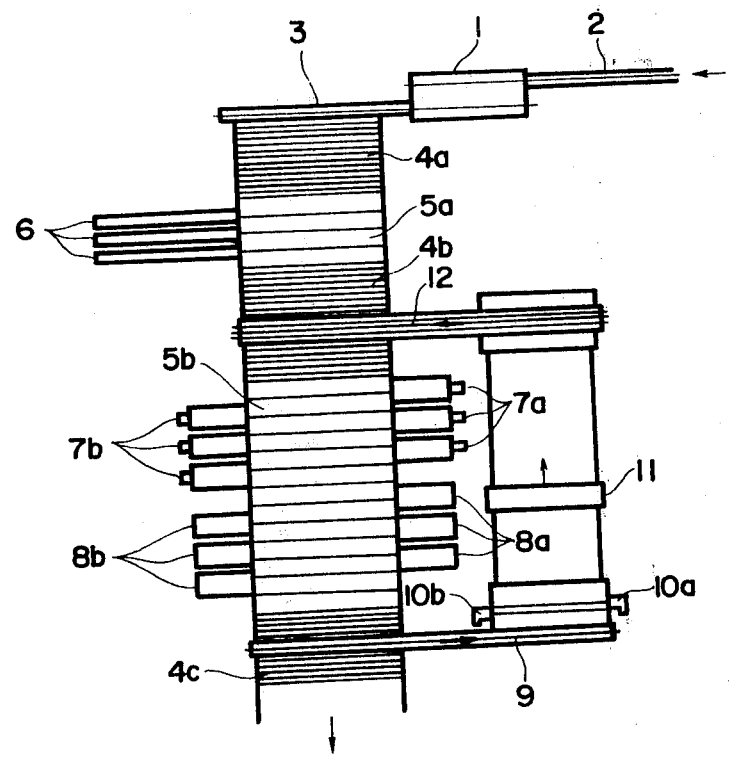

PROCESSING OF STEEL PIPES OR ROUND BARS

BACKGROUND OF THE INVENTION

The present invention relates to conditioning processing apparatus for performing conditioning or finishing operations including processing operations such as chamfering, beveling, tapering and thread cutting and inspecting operations for these processing operations on the ends of round bars or seamless steel pipes transferred from the preceding forming stage such as the rolling stage on a round bar or seamless steel pipe production line. More particularly, the invention relates to a rationalized conditioning processing apparatus comprising a plurality of end processing multifunction machines each capable of performing by itself the required processing operations and a plurality of end inspecting multifunction machines each capable of performing by itself the required inspecting operations, thereby performing the end processing operations and the inspecting operations, respectively, at a single fixed position.

For instance, in an oil well casing seamless pipe production line the semi-finished pipes which were rolled, cooled and cut substantially to lengths are transferred to a conditioning line where such processing operations as chamfering, tapering and thread cutting on the pipe ends as well as the required finish inspections for these processing operations are performed and then after screwing pipe end protectors, couplings, etc., on the pipes where required, the pipes are subjected to a series of processes such as hydrostatic testing, measurement and weighing and marking, thus producing the finished products. In the past, it has been the practice with such conditioning lines so that a large number of processing machines and inspecting machines each corresponding to one of processing or inspecting operations are arranged along each conditioning line. Thus, since each of these machines is a single function machine, there are disadvantages that not only the number of lines must be increased but also the efficiency of the machines must be increased in order to increase the overall line efficiency, that the operating efficiency of the equipment is subject to considerable variations due to variations in pipe end shape, that a huge space is required for installing the line since each of the single function machines requires its own table unit and that the specifications for the single function processing capacity of each single function machine are excessive since the machine is required to move in and out the whole length of each round bar or steel pipe each time only the pipe ends are processed or inspected.

SUMMARY OF THE INVENTION

It is the primary object of the present invention to ensure a greater conditioning capacity without increasing the number of conditioning lines and also to reduce the required space for conditioning equipment and simplify the arrangement of the operating units of the line.

Thus, in one form of a conditioning processing apparatus according to the present invention, a plurality of end processing multifunction machines each capable of serving a plurality of processing functions such as chamfering, tapering and thread cutting are arranged in correspondence to the required processing capacity along the sides of a single-line transverse transfer system such that the ends of each steel pipe or round bar are subjected to the end processing operations at the same position and a plurality of end inspecting multifunction machines each capable of serving a plurality of inspection functions such as chamfer inspection and threads inspection are similarly arranged at positions downstream of the end processing multifunction machines. In accordance with another form of the invention the feed pitch or length of the transverse transfer system can be varied to any of a plurality of different feed pitches within the processing area of the plurality of end processing multifunction machines and the inspection area of the plurality of end inspecting multifunction machines.

The variable feed pitch transverse transfer system may for example be of the walking beam type proposed by the inventors in U.S. patent application No. 295,253 filed on Aug. 24, 1981 or of the chain type such that pipes are transferred at selected one of a plurality of different feed pitches such as 1:3, 1:2 and 1:1 of the transfer loading pitch.

In accordance with the present invention, there are many industrial advantages that it is possible to construct a conditioning line which requires a reduced space and simple in line arrangement, that the capacity of the single-line conditioning processing apparatus can be increased as desired and it can be operated at a plurality of different feed pitches, that it is possible to prevent the entire line from being stopped due to any trouble of the operating units and also there is no need to stop the line during the maintenance of the operating units or during the tool changing operation, that the balance of capacity can be easily realized when the apparatus is connected on-line operation with any high-efficiency proceding stage such as the seamless steel pipe rolling line.

In the description to follow, the invention will be described in detail as applied to a conditioning line for seamless steel pipes used as casing pipes with reference to the illustrated embodiment. With the invention, however, the subject materials to be processed are not limited to such steel pipes and steel pipes for various other uses and round bars are of course included in the subject materials.

BRIEF DESCRIPTION OF THE DRAWING

The single FIGURE drawing is a plan view showing the line arrangement of a conditioning processing appratus according to an embodiment of the present invention which is shown by way of example as connected to the preceding stage or rolling line.

DESCRIPTION OF THE PREFERRED EMBODIMENT

Referring to the drawing, numeral 1 designates a cutting machine for receiving the rolled pipes from an axial transfer conveyor 2, cutting off the crop ends of the pipes and cutting the pipes practically in lengths, and connected to its exit-side conveyor 3 is a receiving table 4a which serves as a buffer and is provided with a transverse transfer mechanism. Also provided downstream of the table 4a are a variable feed pitch transverse transfer unit 5a of the previously mentioned walking beam type, an entry-side buffer table 4b with a transverse transfer mechanism, another variable feed pitch transverse transfer unit 5b of the walking beam type and another exit-side buffer table 4c, and these units including the table 4a are arranged successively in this order to form a single line transverse transfer system. The variable feed pitch transverse transfer units 5a and 5b are each comprised for example of the walking beam type proposed in the prior patent application of the present applicant so that the feed pitch or length of the pipes to be transferred can be changed to any one of a plurality of different pitches such as 1:1, 1:2 and 1:3 of the loading pitch with which the pipes are arranged in line and loaded at equal spaces on the buffer table 4a or 4b. In the illustrated embodiment, the maximum ratio of the feed pitch is selected 1:3 so that the corresponding three inner surface cleaners 6 are arranged along one side of the transverse transfer unit 5a and also end processing multifunction machines 7a and 7b and end inspecting multifunction machines 8a and 8b, each three in number, are arranged along the sides of the transverse transfer unit 5b. The multifunction machines 7a and 8a are provided for one end of the pipes and the multifunction machines 7b and 8b are provided for the other end of the pipes.

The end processing multifunction machines 7a and 7b are of the same type capable of performing a plurality of processing functions such as cutting off the defectively shaped end portions, chamfer cutting, taper cutting and thread cutting and thus each machine is adapted to perform a plurality of machining operations at the same position through changing of the machining heads.

Also, each of the end inspecting multifunction machines 8a and 8b is capable of effecting a plurality of inspection items such as chamfer inspection, taper inspection and threads inspection and thus each machine is capable of effecting the inspection items corresponding to the processing operations performed by each end processing multifunction machine 7a or 7b at the same position by selectively changing the inspection heads.

Also, a conveyor 9 is connected to the exit-side buffer table 4c so that those pipes determined as defective by the above-mentioned inspections are transferred to the outside of the line, and the accepted pipes are fed downstream from the table 4c so that the pipes are subjected to such additional processes such as the hydrostatic test, measurement and weighing, marking, etc., and are then transported to the product yard. Provided in the front of the conveyor 9 are pipe end cutters 10a and 10b for cutting off as offline operation the defective portions of the pipes for reprocessing so that the recut pipes are returned to the entry-side buffer table 4b by means of a transfer car 11 and a second axial transfer conveyor 12 and the pipes are subjected to the processing operations by the multifunction machines 7a and 7b and the inspections by the inspecting machines 8a and 8b.

The variable feed pitch transverse transfer units 5a and 5b are operated such that when all three of the multifunction machines 7a, 7b, 8a and 8b, respectively, are brought into operation, the pipes are simultaneously transferred each over a distance corresponding to the feed pitch of 1:3. On the other hand, if any one of the multifunction machines is stopped by any trouble, only two of the processing multifuncation machines 7a and 7b and inspecting multifunction machines 8a and 8b, respectively, are operated and the pipes are transferred at the feed pitch of 1:2, thus reducing the processing capacity to two thirds and thereby preventing the line from being stopped entirely. In accordance with this embodiment, stoppage of the line can be avoided so far as one each of the respective multifunction machines is operated and the pipes are fed at the 1:1 feed pitch (the capacity is ⅓) and this is worth noting not only as an anti-trouble measure but also as a means of ensuring the continued operation during the periods of such operations as the maintenance of the operating units and the tool changing operation. Of course, the number of each type of the multifunction machines is not intended to be limited to 3 and any number of each type of the machines can be used so as to perform without any hindrance the required end processing and inspecting operations on the ends of pipes. In this case, it is only necessary to arrange the apparatus so that the pipes are transferred transversely at as many different pitches as the number of each type of the machines.

What is claimed is:

1. Apparatus for conditioning cylindrical workpieces, said apparatus comprising:
    an axial transfer line system for axially feeding cylindrical workpieces such as steel tubes and round bars formed by a preceding forming operation;
    a single transverse transfer line system connected transversely with said axial transfer line system for transversely feeding said workpieces;
    conditioning means arranged on at least one side of said transverse transfer system for performing cutting processing operations on the end portions of the workpieces including beveling for welding, chamfering for starting thread cutting, thread cutting, and lead cutting;
    inspection means for performing inspection operations on processed portions of said workpieces including inspection of beveled and chamfered portions and inspection of threaded portions;
    said single transverse transfer line system having a portion with a feed pitch that is variable in steps, said portion positioned within the end processing area for each workpiece; and
    said conditioning means and said inspection means being multifunctional and capable of performing plural functions and positioned at a variable feed pitch portion of the transverse transfer line system in a number corresponding to the maximum value of the feed pitch steps of said transverse transfer line.

2. The apparatus according to claim 1, wherein said transverse transfer line includes buffer tables having a transverse transfer mechanism and positioned on the upstream and downstream sides of said variable feed pitch portion.

3. The apparatus according to claim 2, wherein an entry-side buffer table is provided on the upstream side of the conditioning means and an exit-side buffer table is provided on the downstream side of the inspection means, and wherein reconditioning means is provided adjacent to said transverse transfer line system, said reconditioning means being connected to each of said buffer tables by a conveyor.

* * * * *